United States Patent [19]

Suga et al.

[11] Patent Number: 4,457,410
[45] Date of Patent: Jul. 3, 1984

[54] LOCK-UP CONTROL SYSTEM FOR A LOCK-UP TYPE AUTOMATIC TRANSMISSION OF AN AUTOMOTIVE VEHICLE HAVING AN ENGINE

[75] Inventors: Masaaki Suga, Yokohama; Morimoto Yoshiro; Hamada Hideo; Eutagi Masaaki; Suzuki Tadashi, all of Yokosuka, Japan

[73] Assignee: Nissan Motor Co., Ltd., Yokohama, Japan

[21] Appl. No.: 271,125

[22] Filed: Jun. 8, 1981

[30] Foreign Application Priority Data

Jun. 10, 1980 [JP] Japan ................................. 55-77085

[51] Int. Cl.³ ............................................. B60K 41/28
[52] U.S. Cl. ............................. 192/0.052; 192/0.092; 192/3.31; 192/3.58; 74/866; 74/731
[58] Field of Search .................... 192/3.58, 0.04, 0.052, 192/0.076, 0.075, 0.073, 0.092, 3.31, 3.3, 103 R, 3.57, 0.034; 74/866, 731, 732, 733, 763; 364/424.1

[56] References Cited

U.S. PATENT DOCUMENTS

| | | | |
|---|---|---|---|
| 2,856,794 | 10/1958 | Simpson | 74/763 |
| 3,073,179 | 1/1963 | Christenson | 74/733 |
| 3,678,700 | 7/1972 | Bozich | 192/0.034 |
| 3,693,478 | 9/1972 | Malloy | 74/731 |
| 3,705,642 | 12/1972 | Thompson . | |
| 3,710,652 | 1/1973 | Miyazaki | 74/869 |
| 3,752,282 | 8/1973 | Espenshied | 192/3.58 |
| 3,805,640 | 4/1974 | Schneider et al. . | |
| 3,857,302 | 12/1974 | Morris | 74/733 |
| 3,938,409 | 2/1976 | Uozumi . | |
| 3,985,046 | 10/1976 | Morris et al. | 74/733 |
| 4,026,169 | 5/1977 | Kuhnle et al. . | |
| 4,027,554 | 6/1977 | Ito et al. | 74/766 |
| 4,034,627 | 7/1977 | Mizote . | |
| 4,046,033 | 9/1977 | Hashimoto et al. . | |
| 4,095,486 | 6/1978 | Ohnuma | 192/3.29 |
| 4,100,530 | 7/1978 | den Brinker et al. . | |
| 4,148,231 | 4/1979 | Redzinski . | |
| 4,208,929 | 6/1980 | Heino et al. . | |
| 4,234,066 | 11/1980 | Toyota et al. | 192/3.58 X |
| 4,236,617 | 12/1980 | Whateley | 192/3.3 |
| 4,262,335 | 4/1981 | Ahlen et al. . | |
| 4,270,636 | 6/1981 | Sunohara et al. . | |
| 4,271,939 | 6/1981 | Iwanaga et al. . | |
| 4,308,764 | 1/1982 | Kawamoto et al. | 74/766 X |
| 4,349,088 | 9/1982 | Ito et al. | 192/3.57 |
| 4,369,865 | 1/1983 | Sunohara et al. . | |
| 4,373,619 | 2/1983 | Schritt et al. | 192/0.052 X |

FOREIGN PATENT DOCUMENTS

| | | |
|---|---|---|
| 878321 | 12/1979 | Belgium . |
| 2375508 | 7/1978 | France . |
| 2422083 | 11/1979 | France . |
| 2422082 | 11/1979 | France . |
| 2435639 | 4/1980 | France . |
| 55-69353 | 5/1980 | Japan . |
| 55-103149 | 8/1980 | Japan . |
| 55-109853 | 8/1980 | Japan . |
| 55-109854 | 8/1980 | Japan . |
| 1536657 | 12/1978 | United Kingdom . |
| 2017840 | 10/1979 | United Kingdom ............... 192/3.31 |

Primary Examiner—George H. Kirzmanich
Attorney, Agent, or Firm—Schwartz, Jeffery, Schwaab, Mack, Blumenthal & Koch

[57] ABSTRACT

The lock-up control system functions to temporally release lock-up operation of a torque converter of the transmission upon occurrence of a gear shift signal even if the automotive vehicle is operating within lock-up range. A plurality of gear shifting detectors are provided, each generating a gear shift signal when triggered. Gate means function to select one of said plurality of gear shifting detectors in response to engine load for allowing transmission of a gear shifting command to a selected gear shifting detector. Delay means are provided to retard transmission of the gear shifting command to the plurality of gear shifting detectors in such a manner that a delay between the occurrence of the gear shifting command and the occurrence of the gear shift signal increases as the engine load decreases.

3 Claims, 8 Drawing Figures

LOCK-UP CONTROL SYSTEM FOR A LOCK-UP TYPE AUTOMATIC TRANSMISSION OF AN AUTOMOTIVE VEHICLE HAVING AN ENGINE

BACKGROUND OF THE INVENTION

1. Field of the Invention

The present invention relates to a lock-up control system for a lock-up type automatic transmission for an automotive vehicle.

2. Description of the Prior Art

Automatic transmissions are provided with a torque converter in a power transmission system thereof so as to increase the torque from the engine. The torque converter has a pump impeller which is driven by the engine to rotate a working oil within the torque converter. The rotation of the working oil causes a turbine runner to rotate under the reaction of a stator, thereby multiplying the torque (torque converter state). Therefore, the torque converter, while in use, cannot help avoiding a slip between its pump impeller and its turbine runner. Therefore, while automatic transmissions provided with torque converters in its power transmission system have an advantage of easy operation, they also have the drawback of poor power transmission efficiency which leads to a poor fuel economy. To alleviate this drawback, there have been proposed torque converters with a direct clutch (often referred to also as a lock-up torque converter) wherein during relatively high vehicle speed operation, when the torque variation of the engine does not create a problem, the turbine runner is directly connected to a pump impeller (lock-up state), thereby eliminating slip therebetween. A lock-up automatic transmission provided with a torque converter of this kind in the power transmission system is already employed in some vehicles.

In an automatic transmission having a torque converter which locks up whenever the vehicle operates in any one of the forward gear ratios and at a vehicle speed exceeding a predetermined vehicle speed corresponding to a particular forward gear ratio, since the lock-up ranges adjoin one another or overlap one another with respect to the vehicle speed, when the vehicle operates in the lock-up ranges with the accelerator pedal depressed deeply, gear shifting takes place with the torque converter left in the lock-up state. When shifting takes place with the torque converter left in the lock-up state, a torque variation is not absorbed by the torque converter, thus creating a great shock upon gear shifting.

Accordingly, it has been proposed to temporarily release the lock-up state during gear shifting even when the vehicle is operating within any one of the lock-up ranges so as to allow the torque converter to operate in the torque converter state. For this purpose, a gear shifting detector is provided that generates a gear shift signal having a predetermined duration in response to and after the occurrence of a command for gear shifting between two adjacent gear ratios, thereby temporarily releasing the lock-up state while the shift signal is present.

However, according to known proposals, a gear shift signal is generated right after the occurrence of a command for gear shifting and the lock-up state of the torque converter is released right after the occurrence of the gear shifting command, thus creating a problem in that the lock-up release occurs earlier than the initiation of the actuation of friction elements for the gear shifting, viz., actual gear shifting. The initiation of actuation of friction elements for the gear shifting takes place upon expiration of a period after the occurrence of a command for such gear shifting because there is a delay in response in the hydraulic control system. Therefore, if the lock-up state is released simultaneously with the occurrence of the shifting command, the release of the lock-up state takes place before the subsequent actual gear shifting operation, causing the engine to race.

This tendency becomes even more marked when the automatic transmission is subjected to upshifting because the upshifting operation takes place in the power-on mode. The problem is more serious upon upshifting from the second gear ratio to the third gear ratio when a clutch is engaged while releasing a brake so that a relatively long time overlap is necessary because the initiation of the actual shifting operation occurs in a delayed timing as compared to that of the other gear shifting operations.

SUMMARY OF THE INVENTION

According to the present invention, the occurrence of a gear shift signal, viz., a lock-up release signal, is delayed from the occurrence of a command for gear shifting to synchronize with the initiation of the actuation of friction elements for the gear shifting resulting from the occurrence of the command for the gear shifting. This delay is variable in accordance with the engine load. For varying the delay in response to the engine load, means are provided for generating a gear shift signal when triggered by the gear shifting command. Means are also provided for detecting engine load and for varying the elapsed time between the occurrence of the gear shifting command and the subsequent generation of the gear shift signal by the gear shift signal generating means in response to the engine load. Therefore, the lock-up of the torque converter is released synchronously with the actuation of the friction elements for gear shifting.

Accordingly an object of the present invention is to provide a lock-up control system wherein the lock-up of the torque converter is released synchronously with the actual gear shifting operation with the transmission over the various engine operating conditions.

BRIEF DESCRIPTION OF THE DRAWINGS

The present invention will be apparent from the following description and drawings in which.

DESCRIPTION OF THE PREFERRED EMBODIMENT

Figure 1:
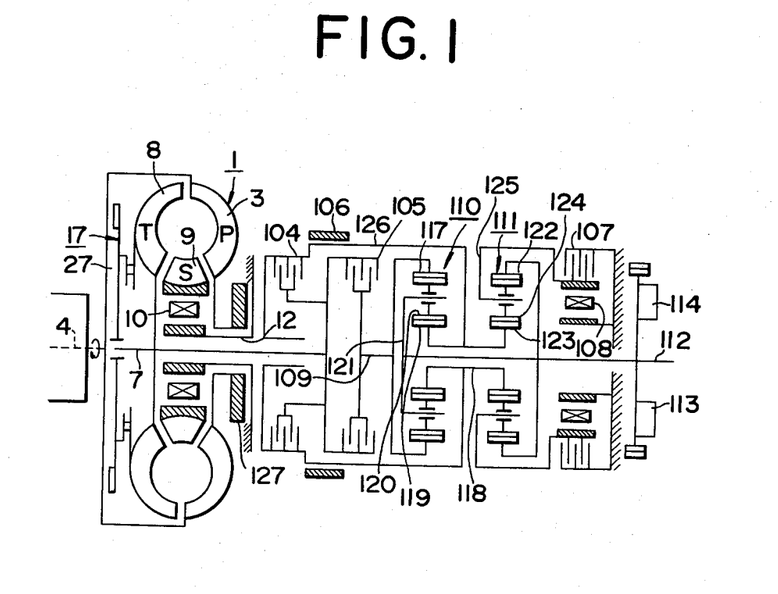
FIG. 1 is a schematic view of a planetary gearing portion of a lock-up type automatic transmission.

Referring to the drawings and particularly to FIG. 1, there are shown a crankshaft 4 driven by a prime mover, such as an engine, a torque converter 1 having a lock-up clutch 17 which will be described later, an input shaft 7, a front clutch 104 (a high-and-reverse clutch), a rear clutch 105 (a forward clutch), a second brake 106, a low reverse brake 107, a one-way brake 108, an intermediate shaft 109, a first planetary gear unit 110, a second planetary gear unit 111, an output shaft 112, a first governor valve 113, a second governor valve 114, and an oil pump 13. The torque converter 1 comprises a pump impeller 3, a turbine runner 8, and a stator 9, in which the pump impeller 3 is driven by the crank shaft 4 to circulate the torque converter operation oil therein so as to transmit torque to the turbine runner 8 fixed on the input shaft 7. The torque is further transmitted by the input shaft 7 to a change-speed planetary gearing. The stator 9 is disposed on a sleeve 12 through a one-way clutch 10, the one-way clutch allowing the stator 9 to rotate in the same direction as the crankshaft 4, that is, in the direction indicated by an arrow in FIG. 1 (this rotation is referred to as forward rotation hereinafter), but not allowing it to rotate in the reverse direction (this rotation is referred to as reverse rotation hereinafter). The first planetary gear unit 110 comprises an internally toothed gear 117 fixed on the intermediate shaft 109, a sun gear 119 fixed on a hollow transmitting shaft 118, and a plurality of planetary pinions 120 capable of performing rotation and revolution simultaneously while meshing with the internally toothed gear 117 and sun gear 119 respectively, and a planetary pinion carrier 121 for supporting the planetary pinions 120 fixed on an output shaft 112, wherein the second planetary gear unit 111 comprises an internally toothed gear 122 fixed on the output shaft 112, a sun gear 123 fixed on the hollow transmitting shaft 118, and a plurality of planetary pinions 124 capable of performing rotation and revolution while meshing with the internally toothed gear 122 and sun gear 123 respectively, and a planetary pinion carrier 125 for supporting the planetary pinions 124. The front clutch 104 is operative to connect the input shaft 7, driven by the turbine runner 8, to the hollow transmitting shaft 118 integrally rotatable with both of the sun gears 119 and 123 through a drum 126, whereas the rear clutch 105 is operative to connect the input shaft 7 to the internally toothed gear 117 of the first planetary gear unit 110 through the intermediate shaft 109. The second brake 106 is operative to anchor both sun gears 119 and 123 by braking the drum 126 fixed on the hollow transmitting shaft 118, whereas the low reverse brake 107 is operative to anchor the pinion carrier 125 of the second planetary gear unit 111. The one-way brake 108 allows forward rotation of the pinion carrier 125 but not reverse rotation thereof. The first and second governor valve assemblies 113 and 114 are operatively connected to the output shaft 112 and produce governor pressure in response to the vehicle speed.

Now, power flow paths to be established when a manual speed selector rod is set in D position (forward drive range) will be explained.

In this position, only the rear clutch 105, a forward clutch, is in its engaged condition. The power output of the engine via the torque converter 1 is transmitted by the input shaft 7 and rear clutch 105 to the internally toothed gear 117 of the first planetary gear unit 110. This rotation of the internally toothed gear 117 causes the planetary gears 120 to rotate in the forward direction. Accordingly, the sun gear 119 rotates in the reverse direction, and, since the sun gear 123 of the second planetary gear unit 111, which is rotatable with the sun gear 119, rotates in the reverse direction, the planetary gears 124 of the second planetary gear unit 111 rotates in the forward direction. The one-way brake 108 acts as a forward reaction brake to prevent the pinion carrier 125 from being rotated in the reverse direction by the sun gear 123, thus causing the forward rotation of the internally toothed gear 122 of the second planetary gear unit 111. Accordingly, the output shaft 112 which is rotatable with the internally toothed gear 122 rotates in the forward direction, thereby establishing the first forward gear ratio.

If, in this state, the vehicle speed increases enough to cause the application of the second brake 106, the power flow path through the input shaft 7 and rear clutch 105 up to the internally toothed gear 117 is the same as that for the first forward speed. The second brake 106 acts as a forward reaction brake to anchor the drum 126 for preventing the rotation of the sun gear 119. This causes the planetary pinions 120 to rotate, revolving simultaneously, around the anchored sun gear 119, and accordingly the planetary pinion carrier 121 and output shaft 112, which is rotatable with the pinion carrier 121, rotate at a faster speed than in the case of the first speed although with a certain reduction ratio, thereby establishing the second forward gear ratio.

If the vehicle speed further increases so as to cause the second brake 106 to be released and, in lieu thereof, the front clutch 104 to be engaged, the power on the input shaft 7 is transmitted partially through the rear clutch 105 to the internally toothed gear 117, while the remainder is transmitted through the front clutch 104 to the sun gear 119. Thus, the internally toothed gear 117 and sun gear 119 are interlocked and rotate in the forward direction, as a unit, together with both the pinion carrier 121 and output shaft 112 at the same rotational speed, thereby establishing the third forward gear ratio. In this case, the input is fed to both the front clutch 104 and rear clutch 105 and the torque increase is not carried out by the planetary gears so that none acts as a reaction brake in this state.

Nextly, the power transmission path in the case when the selector rod is positioned in R (rearward running) position is explained.

In this position, the front clutch 104 and low-reverse-brake 107 are engaged. The driving power transferred from the engine through the torque converter 1 is transferred from the input shaft 7 through the front clutch 104 and the drum 126 up to the sun gears 119 and 123. In this state, since the rear planetary carrier 125 is anchored by the low-reverse brake 107, the forward rotation of the sun gears 119 and 123 causes the internal gear 122 to rotate in the reverse direction at a reduction speed, thus causing the output shaft 112 that is in rotary unison with this internal gear, to produce a reverse drive ratio.

The planetary gearing arrangement illustrated in and described in connection with FIG. 1 is similar in construction to the planetary gearing arrangement disclosed in U.S. Pat. No. 2,856,794 issued to H. W. Simpson, on Oct. 21, 1958, and reference thereto may be made for a more complete description of the construction and operation of the transmission.

Figure 2A:
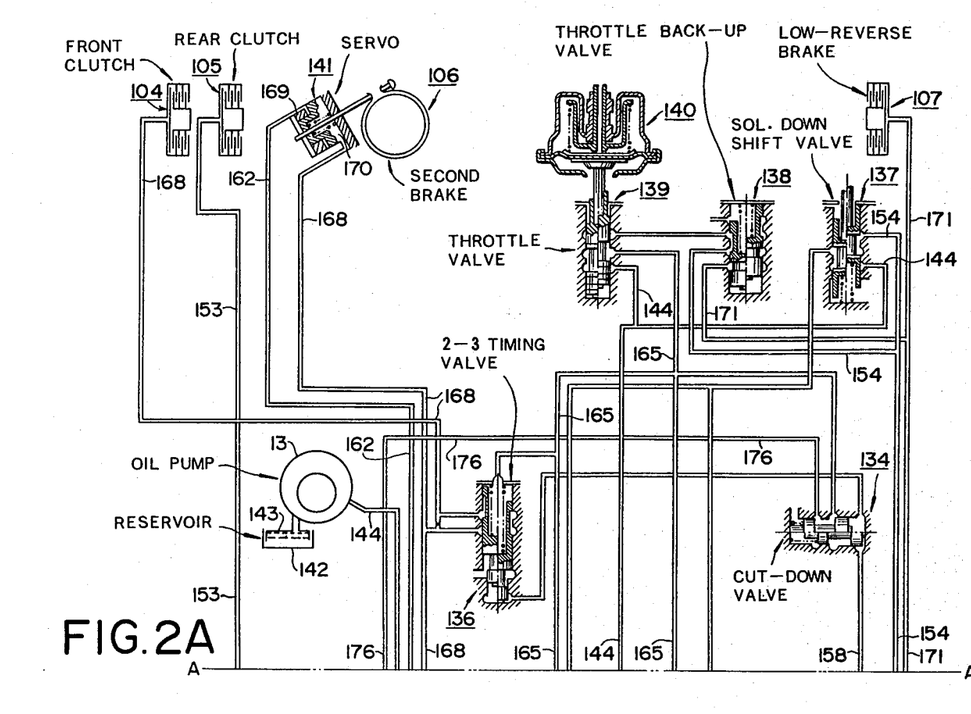
FIGS. 2A and 2B, when combined, provide a schematic view of a hydraulic control portion of the lock-up type automatic transmission.
Figure 2B:
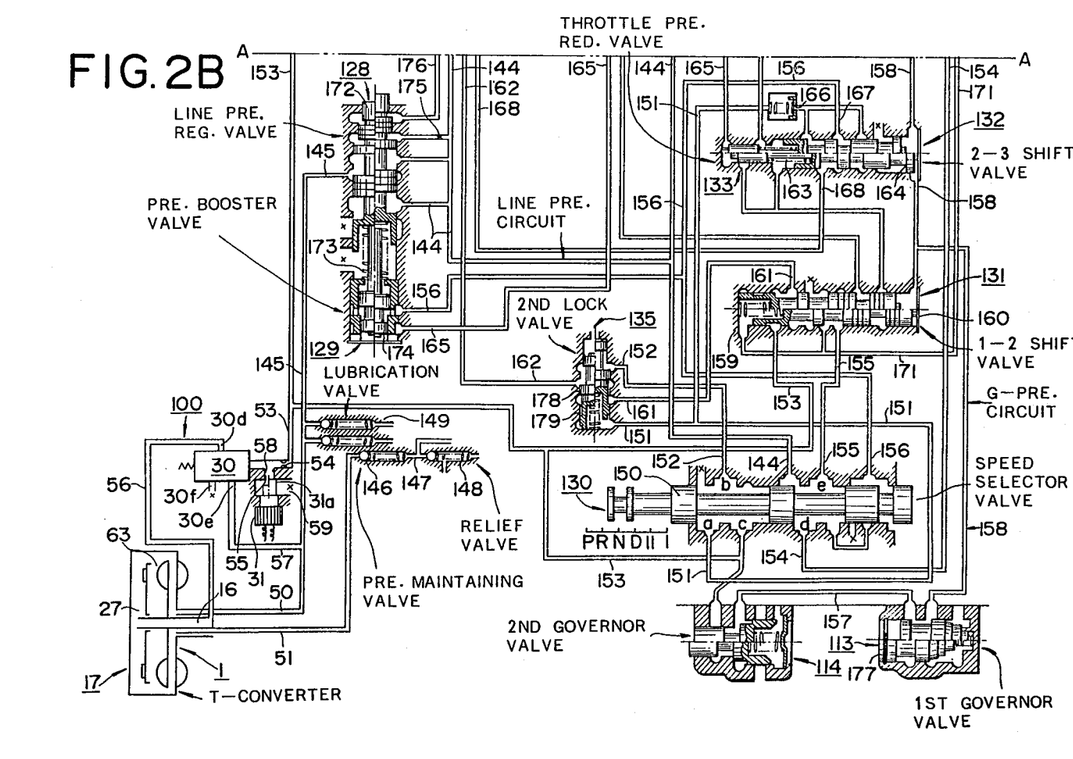

FIGS. 2A and 2B show a hydraulic control system of the above-described change speed transmission, which control system comprises an oil pump 13, a line pressure regulator valve 128, a pressure booster valve 129, a torque converter 1, a speed selector valve 130, a first governor valve 113, a second governor valve 114, a 1-2 shift valve 131, a 2-3 shift valve 132, a throttle pressure reducing valve 133, a cut-down valve 134, a second lock valve 35, a 2-3 timing valve 136, a solenoid down shift valve 137, a throttle back-up valve 138, a vacuum throttle valve 139, a vacuum diaphragm 140, a front clutch 104, a rear clutch 105, a second brake 106, a servo 141, a low-reverse brake 107, and oil pressure circuits. The oil pump 13 is driven by a prime mover through the drive shaft 14 and the pump impeller P of the torque converter 1 for drawing oil from a reservoir 142 through a strainer 143, where harmful dust is removed, during all operating conditions of the prime mover to send the oil to a line pressure circuit 144. The oil is regulated by the line pressure regulator valve 128 and the thus regulated oil is transmitted to the torque converter 1 and speed selector valve 130.

The hydraulic control system illustrated in FIGS. 2A and 2B is similar in construction to the hydraulic control system disclosed in U.S. Pat. No. 3,710,652, issued to T. Miyazaki, on Jan. 16, 1973, and reference may be made for a more complete description of the construction and operation of the transmission.

The line pressure regulator valve 128 comprises a spool 172 and a spring 173, in which, in addition to the spring 173, the throttle pressure in a circuit 165 and the line pressure in a circuit 156 act on the spool 172 via a spool 174 of the pressure booster valve 129 against the line pressure from a circuit 144 through an orifice 175 and the pressure from a circuit 176 both acting on upper areas of the spool 172.

The torque converter operating oil pressure is introduced from the circuit 144 through the line pressure regulating valve 128 to a circuit 145 and, with a pressure maintaining valve 146, the level of this pressure is maintained within a certain range. When the pressure exceeds a certain level, the pressure maintaining valve 146 opens to permit the oil into a circuit 127 toward the rear lubricating part of the power transmitting mechanism. When the lubricating oil pressure is too high, a relief valve 148 opens, resulting in a pressure drop. On the other hand, the lubricating oil is supplied from the circuit 145 through a front lubrication valve 149, as it is open, to the front lubricating part of the power transmitting mechanism. The speed selector valve 130 is a manually operable liquid direction switching valve and it comprises a spool 150, and is connected to a speed selector rod (not shown) through a linkage so that manipulating the speed selector rod into any desired one of the positions causes the spool 150 to change the passage of the line pressure circuit 144. FIG. 2B shows a condition of the speed selector valve when the spool takes up the N (neutral) position, wherein the line pressure circuit 144 is permitted to communicate with to two ports d and e.

The first and second governor valves 113 and 114 are in operative condition to produce a governor pressure while the automobile is moving forwardly. When the speed selector valve 130 assumes either D, II or I position, the oil pressure is fed from the line pressure circuit 144 to the second governor valve 114 through the port c of the speed selector valve 130. If under this condition the automobile begins to move, the governor pressure regulated by the second governor valve 114 is supplied to a circuit 157 leading to the first governor valve 113, and subsequently when the vehicle speed reaches a predetermined valve, the spool 177 of the first governor valve 113 moves to a position wherein the circuit 157 communicates with a circuit 158, supplying the latter with the governor pressure regulated by the second governor valve 114. The governor pressure is also supplied to the circuit 158, thus acting on the respective end surfaces of the 1-2 shift valve 131, 2-3 shift valve and cut-down valve 134 against the respective springs which urge these valves toward respective lower half positions illustrated in FIGS. 2A and 2B.

In the oil flow passageway leading from the port c of the speed selector valve 130 through a circuit 153, a circuit 161 and a circuit 162, up to an apply side oil pressure chamber 169, the 1-2 shift valve 131 and second lock valve 35 are separately arranged, and a circuit 152 leads from the port b of the speed selector valve 130 to the second lock-up valve 135.

Accordingly, if the speed selector rod is set in D position, the spool 150 of the speed selector valve 130 is moved to a position providing communication between the line pressure circuit 144 and ports a, b and c. From the port a, the oil pressure is transmitted through the circuit 151 to the second lock valve 135 to act on the lower end thereof for preventing the interruption of the circuits 161 and 162 which are permitted to communicate with each other when the spool 178 is pushed down, which spool is urged upwardly by a spring 179 and urged downwardly by the oil pressure transmitted thereto through the circuit 152 from the port b, while, the oil pressure at the port a is transmitted through an orifice 166 and a circuit 167 to the 2-3 shift valve 132. The oil pressure at the port c is transmitted through a circuit 153 to the second governor valve 114, rear clutch 105, and 1-2 shift valve 131, thereby the first forward gear ratio condition of the transmission being provided.

When, under this condition, the vehicle speed increases up to a certain level the governor pressure in the circuit 158 urges the spool 160 to the 1-2 shift valve 131, which is urged to the right by the spring 159, to move to the left, for effecting an upshift from the first forward speed to the second forward speed, and, as a result, the circuit 153 is permitted to communicate with the circuit 161 thereby allowing the oil pressure to be transmitted through the second lock valve 135 to the apply side oil pressure chamber 169 of the servo 141 through a circuit 162 to apply the second brake 106, thus establishing the second forward gear ratio condition.

Since the 1-2 shift valve 131 in this control system is minimized, the spool 160 highly responsive to effect movement to the left with the necessary speed, so that the vehicle speed at which the upshift is made does not move toward the higher vehicle speed side from the designed speed level.

When the vehicle speed further increases up to another certain level, the governor pressure in the circuit 158 urges the spool 164 of the 2-3 shift valve 132 to the left overcoming the spring 163, so that the circuit 167 is permitted to communicate with the circuit 168 directing the oil pressure, through the circuit 168, to the release-side oil pressure chamber 170 of the servo 141 so as to release the second brake 106 and also to the front clutch 104 to engage the clutch 104, thus the third forward gear ratio condition is established.

If the driver depresses the acclerator pedal down to a position causing the full opening of the throttle valve during operation with the speed selector lever in D position, an unillustrated kickdown switch is closed or rendered on to energize a downshift solenoid (not illustrated) for the solenoid downshift valve 137. This urges the spool 190 of the solenoid downshift valve 137 downwardly against a spring 191 from the locked position as illustrated by the right half in FIG. 2A. This movement of the spool 190 allows the kickdown circuit 180 to communicate with the line pressure circuit 144, thus allowing transmission of line pressure through the circuits 144 and 180 to the 1-2 shift valve 131 and the 2-3 shift valve 132 to act in opposed relationship with the governor pressure. If, under this condition, the vehicle is operating in the third gear ratio, the spool 164 of the 2-3 shift valve is forced to move against the governor pressure toward the right hand position viewing in FIG. 2B by the above-mentioned line pressure, thus effecting a forced downshift from the thrid gear ratio to the second gear ratio when the vehicle speed falls in a predetermined range, thus providing a sufficient amount of acceleration force. If the above-mentioned kickdown is carried out during operation in the second gear ratio, since the governor pressure is relatively low, the spool 160 of the 1-2 shift valve 131 is forced to move rightwardly against the governor pressure from the left hand position. This causes a forced downshift from the second gear ratio to the first gear ratio, thus providing a sufficient amount of acceleration force to meet the relatively heavy load.

If the speed selector lever is moved to the II position (2nd forward speed fixed), the spool 150 of the speed selector valve 130 is moved to a position providing communication between the line pressure circuit 144 and the ports b, c and d. The oil pressure at the port b is fed to the same place as in the case of D and the oil pressure at the port c is fed to the rear clutch to engage the latter. Because, under this condition, the oil pressure does not act on the lower end of the second lock valve 135 and because the lower land has a larger area than the upper land, which lands form a space on the spool 178 opening to the circuit 152, the spool 178 of the second lock valve 135 is pressed downwardly against the force of the spring 178 to assume a position in which the circuit 152 is permitted to communicate with the circuit 162, permitting the oil pressure to reach the apply side oil pressure chamber 169 of the servo 141 so as to effect application of the second brake 106, thereby the second forward gear ratio condition being established. The oil pressure at the port d is transmitted through the circuit 154 to the solenoid down shift valve 137 and throttle back-up valve 138. Since the communication between the line pressure circuit 144 leading to the speed selector valve 130 and the port a thereof is prevented, the oil pressure does not get through the circuit 151 to the 2-3 shift valve 132, thus neither release of the second brake 106 nor the application of the front clutch 104 will take place, so that an upshift to the third forward speed is prevented. As explained, the second lock valve 135 cooperates with the speed selector valve 130 to lock the transmission in the second forward speed. If the speed selector lever is moved to I position (the first forward speed fixed), the line pressure circuit 144 is permitted to communicate with the ports c, d and e. The oil pressure at the port c reaches the rear clutch 105 to effect clutch engagement and the oil pressure at the port d reach the same places as in the case of II, whereas the oil pressure at the port e is transmitted through the circuit 155, 1-2 shift valve 131 and the circuit 171 to the low-reverse brake 107 so as to apply the low reverse brake 107 which, when applied, acts as a forward reaction brake, thereby rendering the transmission in the first forward gear ratio condition. The oil pressure at the port e is applied to the left end of the 1-2 shift valve assembly 131, through the circuit 171, urging to press the spool 160 to the right in cooperation with the spring 159, thereby locking the transmission in the first forward speed once a downshift is made thereto.

In FIG. 2B, the reference numeral 100 denotes a lock-up control system according to the present invention which control system comprises a lock-up control valve 30 and a lock-up solenoid 31.

Figure 3A:
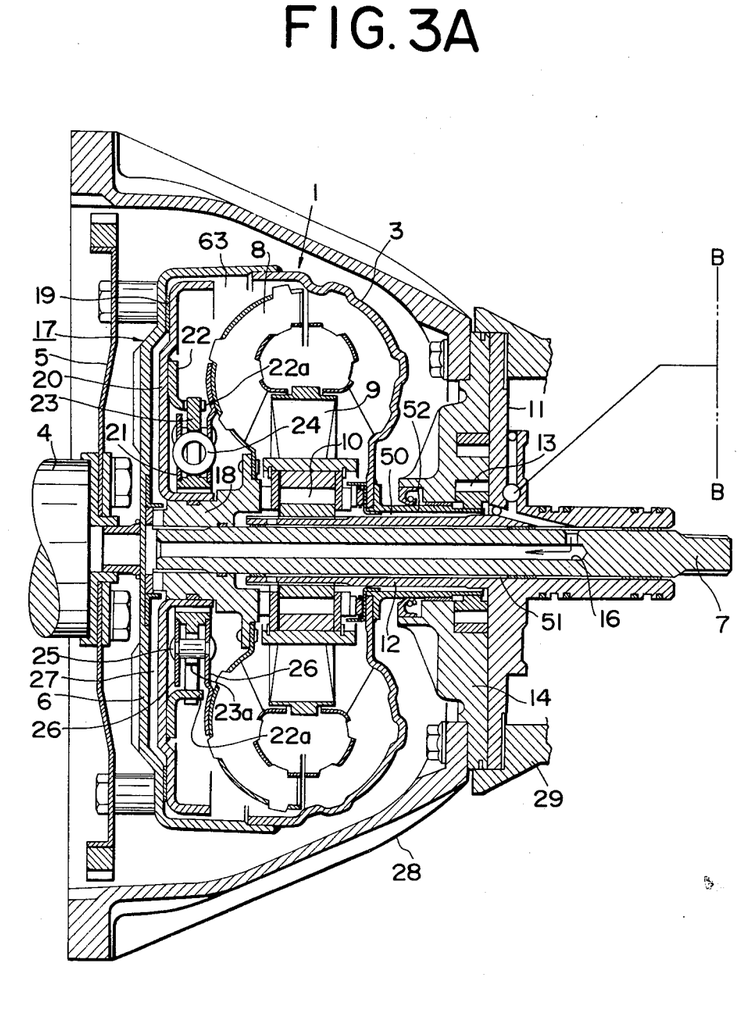
FIGS. 3A and 3B, when combined, provide a schematic sectional view showing the torque converter with the lock-up clutch, lock-up control valve and lock-up solenoid shown in FIG. 2B.
Figure 3B:
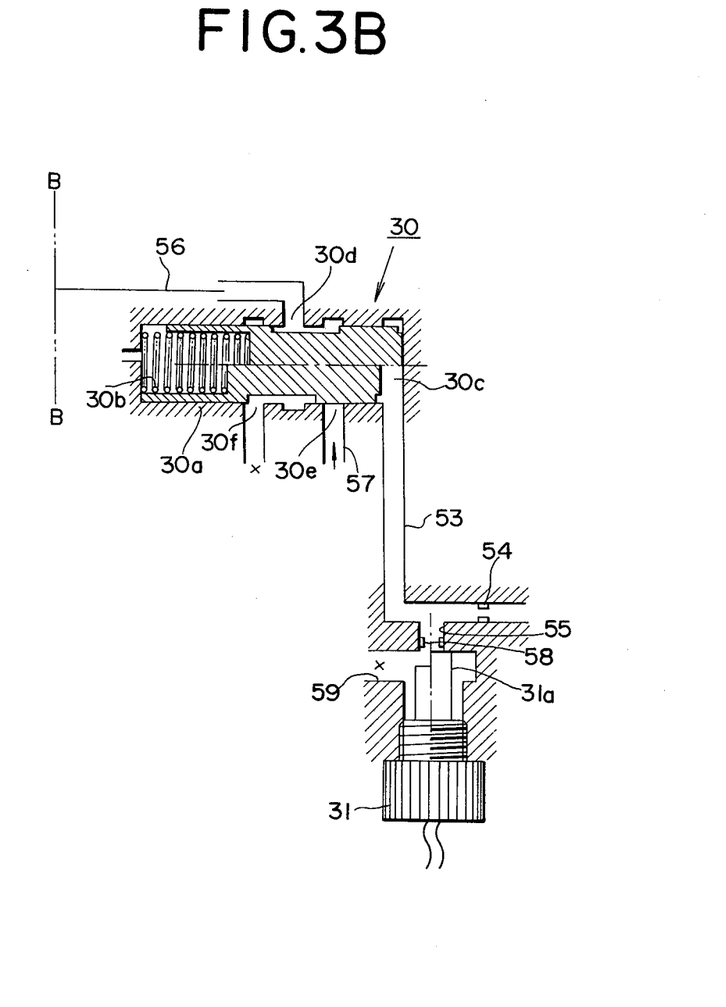

Referring to FIGS. 3A and 3B, the lock-up control valve 30, lock-up solenoid 31 and torque converter 1 with a lock-up mechanism are specifically explained hereinafter.

The pump impeller 3 of the torque converter 1 is connected via a torque converter cover 6 with a drive plate 5, which drive plate is connected to the engine crankshaft 4. The turbine runner 8 is splined to an input shaft 7 with a hub 18, and further the stator 9 is connected to the sleeve 12 via the one-way clutch 10. The torque converter 1 is enclosed by a converter housing 28 which is connected together with a pump housing 14 and a pump cover 11 to a transmission case 29. The pump housing 14 and pump cover 11 cooperate to define a chamber within which said oil pump 13 is accommodated, which pump is connected to the pump impeller 3 through a hollow shaft 52 driven by the engine. The hollow shaft 52 jackets therein a sleeve 12 to define an annular oil fed passage 50 for said operating oil, and the sleeve 12 allows the input shaft 7 to extend therethrough an cooperate to define therebetween an oil discharge passage 51 for said operating oil. The sleeve 12 is formed integrally with the pump cover 11.

The lock-up mechanism 17 has the following structure. A lock-up clutch piston 20 is fit around the hub 18 in an axially slidable manner, and this lock-up clutch piston is accommodated within the converter cover 6. The lock-up clutch piston 20 has an annular clutch facing 19 fixed to a surface thereof positioned opposite to the end wall of the torque converter cover 6, thereby to provide an arrangement wherein when this clutch facing contacts with the end wall of the converter cover 6, a lock-up clutch chamber 27 and a torque converter chamber 63 are defined on the opposite sides of the lock-up clutch piston 20.

The lock-up clutch piston 20 is drivingly connected to the turbine runner 8 via a torsional damper 21. The torsional damper 21 is of the same type as that used in a dry-type clutch and the like and comprises a drive plate 23, torsional springs 24, rivets 25 and driven plates 26. An annular member 22 is welded to the lock-up clutch piston 20 and has it claws 22a drivingly engaging in cutouts 23a formed through the drive plate 23, and the driven plate 26 is attached to the turbine runner 8. The lock-up chamber 27 communicates with a lock-up passage 16 formed through the input shaft 7, which lock-up passage is operatively associated with said lock-up control system 100.

The lock-up control valve 30 is provided with a spool 30a which when taking an illustrated upper half position in FIG. 3B, permits a port 30d to communicate with a port 30e and, when taking an illustrated lower half position, permits the port 30d to communicate with a drain port 30f. The port 30d communicates through a passage 56 with the lock-up passage 16, the port 30e communicates through a branch passage 57 with a torque converter operating oil supply passage 50 as shown in FIG. 2B, and the chamber 30c communicates through a passage 53 with the rear clutch pressure passage 153 as shown in FIG. 2B.

An orifice 54 is provided in the passage 53 at an intermediate portion, and the passage 53 has a branch passage 55 from a location between this orifice and the chamber 30c. The branch passage 55 has therein an orifice 58 and communicates with a drain port 59 and is associated with the lock-up solenoid 31 adapted to open and close the branch passage 55. For this purpose, the lock-up solenoid 31 has a plunger 31a which normally takes an illustrated left half position in FIG. 2B or FIG. 3B, but when the solenoid 31 is energized, projects to assume a illustrated right half position to close the branch passage 55.

When the lock-up solenoid 31 is not energized to allow the plunger 31a to open the branch passage 55, this branch passage communicates with a drain port 59. Then, the rear clutch pressure in the passage 53 and directed toward the chamber 30c is discharged through a drain port 59, thus allowing the lock-up control valve 30 to communicate the port 30d with the port 30e because the spool 30a is urged by a spring 30b to take the illustrated upper half position in FIG. 3B. Therefore, a torque converter interior pressure reaching the passage 57 is supplied through the ports 30e, 30d, passage 56, passage 16 to the lock-up chamber 27, thus causing the pressure within the lock-up chamber 27 to have the same pressure value as that within the converter chamber 63. This causes the lock-up clutch piston 20 to move rightwardly from the illustrated FIG. 3 position to disengage its clutch facing 19 from end wall of the converter cover 6, thus releasing the direct connection between the pump impeller 3 and the turbine runner 8, allowing the torque converter 1 to transmit the power in the torque converter state.

When the lock-up solenoid 31 is energized to cause the plunger 31a to close the branch passage 55, the rear clutch pressure is supplied through the passage 53 to the chamber 30c, allowing the lock-up control valve 30 to communicate the port 30d with the drain port 30f because the spool 30a is moved leftwardly from the illustrated upper half position to the illustrated lower half position in FIG. 3B. This causes the lock-up chamber 27 to communicate through the lock-up passage 16, passage 56, port 30d to a drain port 30f, causing the pressure therein to zero. Then, the lock-up clutch piston 20 is moved leftwardly as viewed in FIG. 3A by means of the torque converter interior pressure to be pressed into contact with the end wall of the torque converter cover 6, thus establishing a lock-up state wherein the pump impeller 3 is connected directly to the turbine runner 8.

Figure 4:
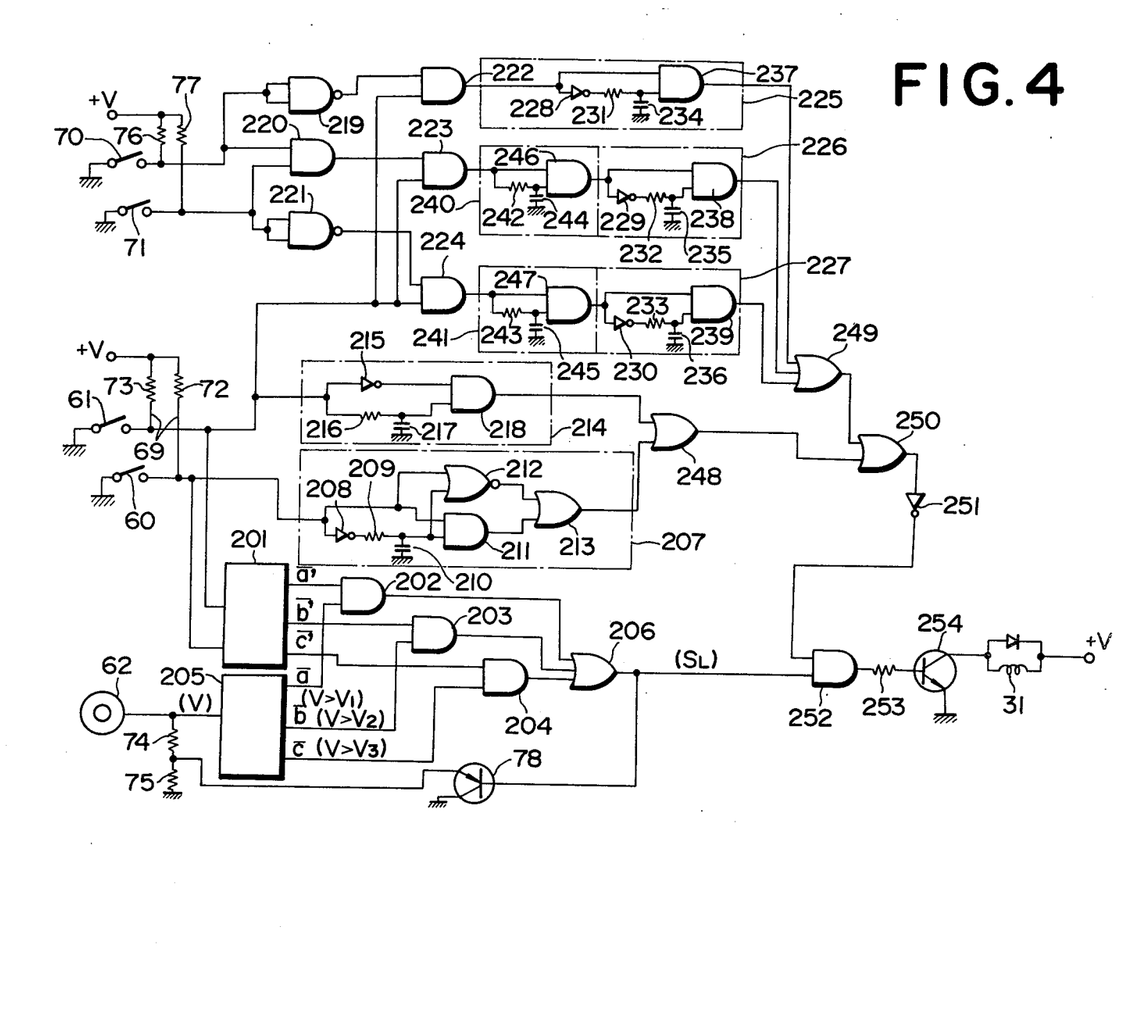
FIG. 4 is a block diagram of a lock-up control system according to the present invention.

On and off of the above-mentioned lock-up solenoid 31 is controlled by an electronic circuit as shown in FIG. 4.

Referring to FIG. 4, 60 denotes a 1-2 shift switch, 61 denotes a 2-3 shift switch, and 62 denotes a vehicle speed sensor, 70 denotes an idle switch, and 71 denotes a full throttle switch.

Figure 5:
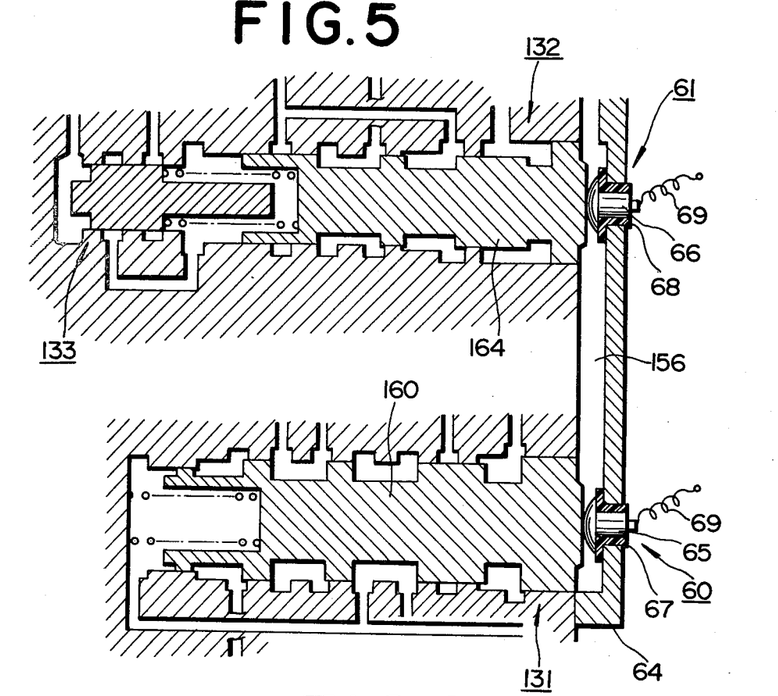
FIG. 5 is a sectional view showing the 1-2 shift valve and 2-3 shift valve incorporating the 1-2 shift switch and 2-3 shift switch shown in FIG. 4.

As clearly shown in FIG. 5, the 1-2 shift switch 60 and 2-3 shift switch 61 are mounted within the 1-2 shift valve 131 and the 2-3 shift valve 132, respectively, in such a manner that they open or close in response to the positions of the respective spools 160, 164. For this purpose, stationary contacts 65, 66 are mounted at opposite positions to the valve spools 160, 164, respectively, and these stationary contacts are electrically insulated from the side plate 64 with insulators 67, 68 and cooperate with the valve spools 160, 164 which act as movable contacts. Since the shift valves 131 and 132 are grounded to the vehicle body, it is only necessary to connect respective leads 69 from the stationary contacts 65, 66 to a power source +V, thus enabling the stationary contact 65 and the valve spool 160 to form the 1-2 shift switch 60 and enabling the stationary contact 66 and the valve spool 164 to form the 2-3 shift switch 61.

As will now be understood from the preceding, when the transmission is in the first gear ratio, both of the valve spools 160, 164 are in contact with the stationary contacts 65, 66 as shown in FIG. 5, thus causing the 1-2 shift switch 60 and the 2-3 shift switch 61 to produce low (L) level signals. When the transmission is in the second gear ratio, the valve spool 160 only is in a position having moved leftwardly to disengage from the stationary contact 65, thus causing the 1-2 shift switch 60 to produce a high (H) level signal. When the transmission is in the third gear ratio, the valve spool 164 is also in a position having moved leftwardly to disengage from the stationary contact 66, thus causing the 2-3 shift switch 61 to produce a H level signal, too.

The vehicle speed sensor 62 generates an electric current proportional to the vehicle speed, and this is grounded through a resistor 74 and the emitter-collector circuit of a PNP transistor 78, thereby providing an electric voltage, as a vehicle speed signal V, indicative of the vehicle speed. When the transistor 78 is rendered off, the above-mentioned electric current is grounded through the resistors 74 and 75, thus causing a rise in the vehicle speed signal by an amount corresponding to an increase in the resistance given by the resistor 75.

The idle switch 70 and full throttle switch 71 are operatively connected with an accelerator pedal such that when the accelerator pedal is released the idel switch 70 is rendered on and when the accelerator pedal is fully depressed the full throttle switch 71 is rendered on. The switches 70 and 71 are connected with the power source +V through respective resistors 76 and 77 so that when the idle switch 70 is closed upon detection of idling operation of the engine (light engine load), a L level signal is generated, and when the full throttle switch 71 is closed upon detection of full throttle operation of the engine (heavy engine load), a L level signal is generated, and when the opening degree of the throttle is between them, H level signals are generated, respectively (intermediate engine load).

The signals from the above-mentioned 1-2 shift switch 60 and 2-3 shift switch 61 are fed to a gear ratio decision circuit 201, the gear ratio decision circuit 201 decides a gear ratio depending upon various combinations as shown in the following Table of the signals from both of the shift switches 60 and 61.

| switch | gear ratio | | |
|---|---|---|---|
| | 1st | 2nd | 3rd |
| 1-2 shift switch | ON(L) | OFF(H) | OFF(H) |
| 2-3 shift switch | ON(L) | ON(L) | OFF(H) |

The gear ratio decision circuit 201 generates a H level signal at a gate $\bar{a}'$ only during operation in the first gear ratio, and a H level signal at a gate $\bar{b}'$ only during operation in the second gear ratio, and a H level signal at a gate $\bar{c}'$ only during operation in the third gear ratio. The signals on these gates are fed to one input terminal of the corresponding AND gates 202 to 204, respectively. The vehicle speed signal V from the vehicle speed sensor 62 is fed to a vehicle speed decision circuit 205. The vehicle speed decision circuit 205 compares the vehicle speed signal V with a lock-up vehicle speed $V_1$ for the first gear ratio, with a lock-up vehicle speed $V_2$ for the second gear ratio and with a lock-up vehicle speed $V_3$ for the third gear ratio, and generates a H level signal at a gate $\bar{a}$ when $V>V_1$, generates another H level signal also at a gate $\bar{b}$ when $V>V_2$, and generates still another H level signal also at a gate $\bar{c}$ when $V>V_3$, and feeds such signals to the other input terminals of the AND gates 202 to 204, respectively. The AND gates 202 to 204 effect AND operation between the above-mentioned signals fed thereto so that the AND gate 202 generates a H level signal during operation within the illustrated lock-up range A in FIG. 6, AND gate 203 generates a H level signal during operation within the illustrated lock-up range B in FIG. 6, and AND gate 204 generates a H level signal during operation within the illustrated lock-up range C in FIG. 6. OR gate 206 receives the outputs from these AND gates 202 to 204 so that it gnerates a lock-up permission signal $S_L$ having a H level during operation within any one of the lock-up ranges A, B and C illustrated in FIG. 6.

Figure 6:
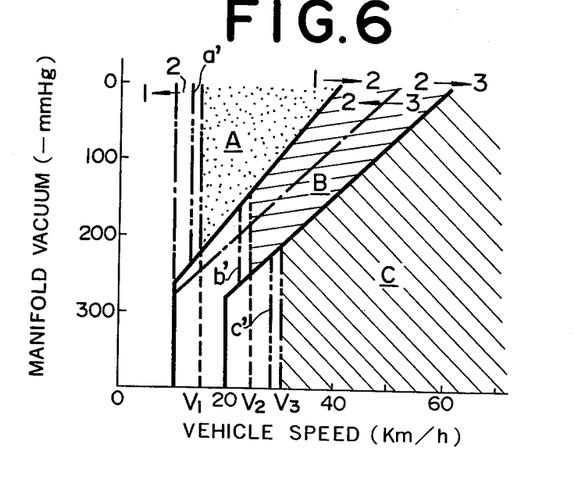
FIG. 6 is a shift pattern diagram showing lock-up ranges.

This H level lock-up permission signal $S_L$ is applied to the base of the transistor 78, rendering same off, and in this state since as described before the vehicle speed signal is in fact increased from a level actually corresponding to the vehicle speed by a constant value that is determined by the resistance of the resistor 75, the actual lock-up release vehicle speeds are lowered and take values a′, b′ and c′ as shown in FIG. 6 which are relatively lower than the lock-up vehicle speeds $V_1$, $V_2$ and $V_3$, thus setting hysterisis.

The signal from the 1-2 shift switch 60 is fed also to a 1-2 shifting detector circuit 207, the circuit being in the form of an edge trigger circuit and comprising a NOT gate 208, a RC circuit that includes a resistor 209 and a condenser or capacitor 210, a rise detecting AND gate 211, a fall detecting NOR gate 212, and an OR gate 213. When the level of the output signal from the 1-2 shift switch 60 rises from a L level up to a H level, viz., when 1-2 upshifting command is issued, the AND gate 211 feeds a H level signal to the OR gate 213 for a period, viz., a time constant determined by the resistor 209 and capacitor 210 of the RC circuit due to discharging of the capacitor 210. On the other hand, when the signal level from the 1-2 shift switch 60 falls from a H level down to a L level, viz., when 2-1 downshifting command is issued, the NOR gate 212 feeds a H level signal to the OR gate 213 for a period, viz., the time constant that is determined by the resistor 209 and capacitor 210 of the RC circuit, and the 1-2 shifting detector circuit 207 keeps on generating at L level signal outside of the above two states.

The signal from the 2-3 shift switch 61 is fed to the 3-2 downshifting detector circuit 214. This circuit 214 is in the form of an edge trigger circuit that detects a fall of the output signal from the 2-3 shift switch 61 and comprising a NOT gate 215, a RC circuit that includes a resistor 216 and a capacitor 219, and an AND gate 218. When the signal from the 2-3 shift switch 61 falls from a H level down to a L level, viz., when 3-2 downshifting command is issued, the AND gate 218 generates a H level signal for a period, viz., a time constant that is determined by the resistor 216 and capacitor 217 of the RC circuit, and the 3-2 downshifting detector circuit 214 keeps on generating a L level signal outside of the above state.

The output signal from the idle switch 70 is fed to a NAND gate 219 and an AND gate 220, while the output signal from the full throttle switch 71 is fed to the AND gate 220 and a NAND gate 221. During idling operation of the engine when the accelerator pedal is released to effect closing of the idle switch 70, a L level signal is generated by the idle switch 70, causing the NAND gate 219 to generate a H level signal. During operation of the engine with heavy load when the accelerator pedal is fully depressed to effect closing of the full throttle switch 71, a L level signal is produced from the full throttle switch 71, causing the NAND gate 221 to generate a H level signal. During operation of the engine with intermediate load when the accelerator pedal is operated between the idle position and the full throttle position to effect opening of both of the switches 70 and 71 to issue H level signals, the AND gate 220 that effects AND operation of these H level signals generates a H level signal. It will now be understood that the NAND gate 219, AND gate 220 and NAND gate 221 generate H level signals, respectively, depending upon the states of engine load, the gate 219 generates a H level signal during engine operation with light load, the gate 220 generating a H level signal during operation with intermediate load and the gate 221 generates a H level signal during operation with heavy load so as to be fed to the corresponding AND gates 222, 223 and 224. The AND gates 222 to 224 also receive the signal from the 2-3 shift switch 61.

Designated by 225 to 227 are 2-3 upshifting detector circuits. The detector circuit 225 is adapted to be selected and put into operation when the engine operates with light load, the detector circuit 226 is adapted to be selected and put into operation when the engine operates with the intermediate load, and the detector circuit 227 is adapted to be selected and put into operation when the engine operates with heavy load. As will be readily seen from FIG. 4, the 2-3 upshifting detector circuits 225, 226 and 227 are identical in construction, each in the form of an edge trigger circuit that detects a rise in output signals from the corresponding AND gate 222 or 223 or 224 and comprises a NOT gate 228 (or 229 or 230), a resistor 231 (or 232 or 233), a capacitor 234 (or 235 or 236) and an AND gate 237 (or 238 or 239).

Between the 2-3 upshifting detector circuits 226 and 227 and the AND gates 223 and 224 corresponding thereto, delay circuits 240 and 241 are provided, respectively.

The delay circuit 240 includes a resistor 242, a capacitor 244 and an AND gate 246. When the engine operates with the intermediate load, the AND gate 223 receives a H level signal from the AND gate 220 so that whenever the output from the 2-3 shift switch 61 changes from a L level to a H level, viz., a command for 2-3 upshifting, the AND gate 223 genetates a H level signal. The generation of the H level signal from the AND gate 223 causes the AND gate 246 to generate a H level signal upon the expiration of charging of the capacitor 244. The other delay circuit 241 includes a resistor 243, a capacitor 245 and an AND gate 247. When the engine operates with heavy load, the AND gate 224 receives a H level signal from the NAND gate 221 so that whenever the output from the 2-3 shift switch 61 changes from a L level to a H level, viz., a command for 2-3 upshifting, the AND gate 224 generates a H level signal. The generation of the H level signal from the AND gate 224 causes the AND gate 247 to generate a H level signal upon expiration of charging of the capacitor 245. The delay provided by the delay circuit 240 is determined by a time constant of the resistor 242 and the capacitor 244, while the delay provided by the delay circuit 241 is determined by a time constant of the resistor 243 and the capacitor 245. The delay provided by the delay circuit 240 is set to correspond to a period beginning with the occurrence of 2-3 upshifting command, viz., a change in output of the 2-3 shift switch 61 from a L level to a H level, and ending with the initiation of actuation of friction elements for 2-3 upshifting operation when the engine operates with intermediate load. The delay provided by the delay circuit 241 is set to correspond to a period beginning with the occurrence of 2-3 upshifting command and ending with the initiation of actuation of friction elements for 2-3 upshifting operation when the engine operates with heavy load.

Upon 2-3 upshifting during engine operation with light load, the AND gate 222 receives a H level signal from the NAND gate 219 so that whenever the 2-3 shift switch 61 switches its output from a L level to a H level, this change causes the AND gate 222 to generate a H level signal to be fed to the 2-3 upshifting detector circuit 225. This causes the AND gate 237 to generate a H level signal for a period determined by a time constant of the capacitor 234 and the resistor 231. The AND gate 237 is allowed to generate a L level signal outside of this state.

Upon 2-3 upshifting during engine operation with the accelerator pedal being operated between the idle position and the full throttle position, the AND gate 223 receives a H level signal from the AND gate 220 so that whenever the 2-3 shift switch 61 switches its output from a L level to a H level, the AND gate 223 generates a H level signal to be fed through the delay circuit 240 to the 2-3 upshifting detector circuit 226. Due to the delay provided by the delay circuit 240, the 2-3 upshifting detector circuit 226 generates a H level signal upon expiration of the delay after the occurrence of change from a L level to a H level of the output from the 2-3 shift switch 61. The 2-3 upshifting detector circuit 226 generates the H level signal for a period that is determined by a time constant of the resistor 232 and the capacitor 235. The 2-3 upshifting detector circuit 226 generates a L level signal outside of this state.

Upon 2-3 upshifting during engine operation with the accelerator pedal fully depressed, the AND gate 224 receives a H level signal from the NAND gate 221 so that whenever the 2-3 shift signal switches its output from a L level to a H level, the AND gate 224 generates a H level signal to be fed through the delay circuit 241 to the 2-3 upshifting detector circuit 227. Due to the delay provided by the delay circuit 241 the 2-3 upshifting detector circuit 227 generates a H level signal upon expiration of the delay after the occurrence of change from a L level to a H level of the output from the 2-3 shift switch 61. The 2-3 upshifting detector circuit 227 generates the H level signal for a period that is determined by a time constant of the resistor 233 and the capacitor 236. The 2-3 upshifting detector circuit 227 keeps on generating a L level signal outside of this state.

It should be noted that all of the shifting detector circuits 207, 214, 225, 226 and 227 keep on generating L level signals during operation modes when gear shifting is not carried out because the shift switches 60 and 61 stay in ON or OFF state. When the all of the outputs from the gear shifting detector circuits 207, 214, 225, 226 and 227 are L level signals, the OR gate 248 and OR gate 249 generate L level signals to the OR gate 250, thus causing the OR gate 250 to generate a L level signal. The L level signal from the OR gate 250 is inversed by a NOT gate 251 into a H level signal. It will now be understood that an AND gate 252 receives the H level signal from the NOT gate 251 during operation when the gear shifting is not carried out. Thus, under this circumstance, the AND gate 252 generates a H level or a L level signal depending upon the presence of or absence of the lock-up permission signal $S_L$ from the OR gate 206.

When the AND gate 252 generates a H level signal upon receipt of the lock-up permission signal $S_L$, this signal is applied to the base of the transistor 254 through the bias resistor 253, thus rendering same conductive to allow energization of the lock-up solenoid 31 with the power source +V, thus shifting the torque converter 1 into the lock-up state. When the AND gate 252 generates a L level signal in response to the absence of the lock-up permission signal $S_L$, the transistor 254 is rendered non-conductive, deenergizing the lock-up solenoid 31, thus rendering the torque converter 1 to operate in the torque converter state. Therefore, the torque converter is in the lock-up state during operation within ranges A, B and C illustrated in FIG. 6, and takes torque converter state outside of these ranges.

However, upon upshifting from the first gear ratio to the second gear ratio or from the second gear ratio to the third gear ratio or upon downshifting from the third gear ratio to the second gear ratio or from second gear ratio to the first gear ratio, the corresponding shift switch 60 or 61 switches its output. Such change is detetcted by the corresponding shifting detector circuit 207 or 214 or 225 or 226 or 227 and a H level signal having a predetermined duration is generated. The generation of this H level signal causes the OR gates 249 and 250 to generate L level signals. Thus, the level of the output from the NOT gate 251 changes from the H level to a L level. Feeding of the L level signal from the NOT gate 251 to the AND gate 252 causes the AND gate 251 to generate a L level signal even if there exists a lock-up permission signal $S_L$ on the other input terminal of the AND gate 252, thus preventing the lock-up solenoid 31 from being energized, thereby releasing the lock-up operation of the torque converter. As a result, the occurrence of a great shock that otherwise would occur if the shifting takes place when the torque converter remains in the lock-up state is prevented.

In summary, according to the preferred embodiment of present invention, since a plurality of 2-3 upshifting detector circuits 225, 226 and 227 are provided in cooperation with delay circuits 240 and 241 which provide different amounts of delay depending upon the engine load, the temporal release of the lock-up which is necessary for actual gear shifting operation can be carried out in in synchronous with the actual shifting operation over the whole engine load, thus preventing the occurrence of engine racing.

Although, in the above described embodiment, the synchronization of the occurrence of a gear shift signal with the actual gear shifting operation has been effected in connection with the 2-3 upshifting only, it is also within the scope of the invention to synchronize the generation of the gear shift signal with the actual gear shifting operation if the situation demands upon gear shifting other than the 2-3 upshifting.

Furthermore, in the above described embodiment, for the purpose of detecting the engine load, the idle switch 70 and the full throttle switch 71 are provided that operatively coact with the accelerator pedal, a switch operable in response to the induction vacuum of the engine may be used.

Furthermore, in the above described embodiment, the output signals from the 1-2 shift switch 60 and 2-3 shift switch 61 are fed to the shifting detector circuits 225 to 227, in the case of an automatic transmission wherein gear shifting decision is carried out through an electronic measure rather than a hydraulic measure, signals which are considered to correspond to the output signals of the shift switches 60 and 61 may be directly fed to the shifting detector circuits.

What is claimed is:

1. A lock-up control system for a lock-up type automatic transmission of an automotive vehicle having an engine, said transmission including a hydraulic control system for operating a plurality of hydraulic devices operable to be selectively actuated to establish one of a plurality of gear ratios, and a torque converter with a lock-up clutch, the torque converter being shiftable into a lock-up state wherein said lock-up clutch is engaged or a torque converter state wherein said lock-up clutch is released, the lock-up control system comprising:
   means for detecting the speed of said vehicle and for generating a vehicle speed signal;
   means for comparing said vehicle speed signal with a reference value and for generating a comparison signal;
   means responsive to said comparison signal for determining when said automotive vehicle is operating in a predetermined lock-up range and for generating a lock-up permission signal when the automotive vehicle is operating in a predetermined lock-up range;
   means for detecting a command for shifting between gear ratios and for generating a shift command indicative signal;
   means responsive to said shift command indicative signal for generating a gear shift signal;
   means for determining a load on said engine and for generating an engine load indicative signal;
   means, responsive to said engine load indicative signal for delaying said shift command indicative signal by a period of time which varies according to said engine load; and
   means, responsive to said lock-up permission signal and said gear shift signal for engaging the lock-up clutch when said lock-up permission signal is present and said gear shift signal is absent and for releasing said lock-up clutch when the gear shift signal is present regardless of the generating of the lock-up permission signal.

2. The lock-up control system of claim 1 wherein said gear shift signal generating means includes a plurality of gear shift detectors and wherein said means for delaying said shift command indicative signal comprises at least two time delay circuits respectively coupled to at least two of said plurality of gear shift detectors, and a logic gate coupled to said delay circuits and said load indicative signal generating means for transmitting said shift command indicative signal to a selected one of said delay circuits according to said engine load indicative signal.

3. A lock-up control system for a lock-up type automatic transmission of an automotive vehicle having an engine, said transmission having a hydraulic control system for operating a plurality of fluid operated friction units, selectively actuable to establish a plurality of gear ratios, said hydraulic control system including a shift valve for shifting between said gear ratios, said transmission also having a torque converter with a lock-up clutch, the torque converter being shiftable between a lock-up state wherein the lock-up clutch is engaged and a torque converter state wherein the lock-up clutch is released, the lock-up control system comprising:
   means for detecting the speed of said vehicle and for generating a vehicle speed signal;
   means for comparing said vehicle speed signal with a reference value and for generating a comparison signal;
   means responsive to said comparison signal for generating a lock-up permission signal;
   means for detecting a load on the engine and generating an engine load indicative signal;
   means, coupled to the shift valve and operable to generate a shift command signal indicative of a command for shifting;
   means for generating a gear shift signal having a predetermined duration upon receiving said shift command signal;
   means, coupled to said shift command signal generating means, said load indicative signal generating means and said gear shift signal generating means for delaying transmission of said shift command signal to said shift signal generating means for a period of time which increases as the engine load decreases; and
   means, coupled to said lock-up permission signal generating means and said gear shift signal generating means for temporarily releasing the lock-up clutch in response to the presence of said gear shift signal regardless of the presence of said lock-up permission signal.

* * * * *